(12) United States Patent
Potasek et al.

(10) Patent No.: US 8,539,832 B2
(45) Date of Patent: Sep. 24, 2013

(54) MEMS GYROS WITH QUADRATURE REDUCING SPRINGS

(75) Inventors: David Patrick Potasek, Minneapolis, MN (US); Marcus Allen Childress, Farmington, MN (US); John Carl Christenson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 269 days.

(21) Appl. No.: 12/911,504

(22) Filed: Oct. 25, 2010

(65) Prior Publication Data

US 2012/0096943 A1    Apr. 26, 2012

(51) Int. Cl.
*G01C 19/56* (2012.01)

(52) U.S. Cl.
USPC .................................. 73/504.12; 73/504.04

(58) Field of Classification Search
USPC ............... 73/504.12, 504.13, 504.14, 504.02, 73/504.04, 504.11
See application file for complete search history.

(56) References Cited

U.S. PATENT DOCUMENTS

| | | | |
|---|---|---|---|
| 5,955,668 A | 9/1999 | Hsu et al. | |
| 6,513,380 B2 | 2/2003 | Reeds, III et al. | |
| 6,539,804 B1* | 4/2003 | Iwata | 73/504.13 |
| 6,715,352 B2* | 4/2004 | Tracy | 73/504.02 |
| 7,260,991 B2* | 8/2007 | Maurer et al. | 73/535 |
| 7,302,847 B2* | 12/2007 | Ito et al. | 73/504.14 |
| 8,042,393 B2* | 10/2011 | Gier et al. | 73/504.02 |
| 2002/0020219 A1* | 2/2002 | DeRoo et al. | 73/504.12 |
| 2002/0189352 A1* | 12/2002 | Reeds et al. | 73/504.04 |
| 2008/0264167 A1* | 10/2008 | Kandori et al. | 73/504.12 |
| 2012/0048018 A1* | 3/2012 | Hammer | 73/504.12 |

FOREIGN PATENT DOCUMENTS

WO    WO-02103364 A2    12/2002

OTHER PUBLICATIONS

P. Merz et al.: "Impact of Si Drie on Vibratory Mems Gyroscope Performance," Transducers & Eurosensors '07, 14th International Conference on Solid-Sate Sensors, Actuators and Microsystems, Lyon, France, Jun. 10-14, 2007, pp. 1187-1190.
M. S. Weinberg et al.: "Error Sources in In-Plane Silicon Tuning-Fork MEMS Gyroscopes," Journal of Microelectromechanical Systems, vol. 15, No. 3, Jun. 2006, pp. 42-54.
Q. Shi, et al.: "Design Principle of Suspension of MEMS Gyroscope," IEE International Conference on Nano/Micro Engineered and Molecular Systems, Jan. 18-21, 2006, Zhuhai, China, pp. 242-245.
MEMESco L.L.C.: "The MEMSco CMRGIP Gyro Sensor Theory of Operation," Dec. 14, 2004, pp. 1-21.

* cited by examiner

*Primary Examiner* — Helen Kwok
(74) *Attorney, Agent, or Firm* — Edwards Wildman Palmer LLP; Joshua L. Jones; Scott D. Wofsy

(57) ABSTRACT

Spring set configurations that include an advantageous combination of spring geometries are disclosed. Spring elements having curved and straight sections, orientation of spring element anchor points with respect to the common radius, orientation of spring element segments with respect to a specific axis, balance of the length of spring elements about the common radius, and mass balance about the common radius can be used to mitigate unwanted out of plane motion. The spring set provides planar motion while reducing undesired out of plane motion making MEMS devices substantially insensitive to the process-induced etch angle variations of the spring elements. The spring set can be used in a MEMS gyro device which maintains the desired resonant modes and consistently low quadrature error even with process variations in manufacturing causing undesirable etch angles.

18 Claims, 9 Drawing Sheets

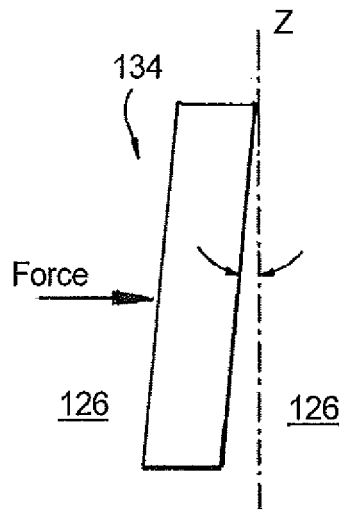
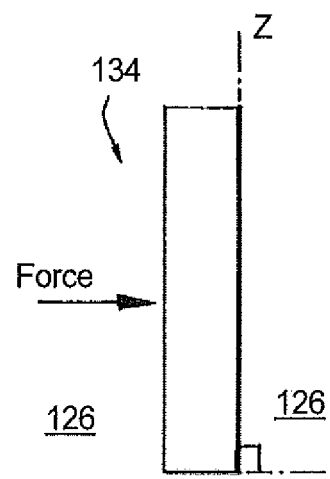
*Fig. 5*  *Fig. 6*
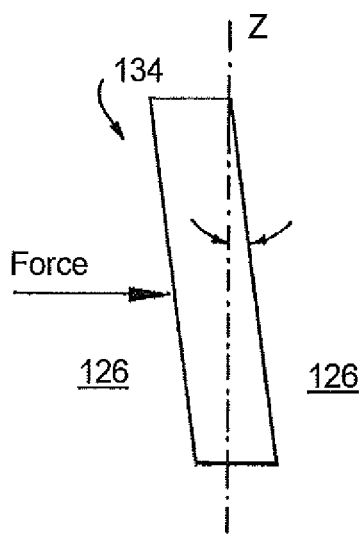
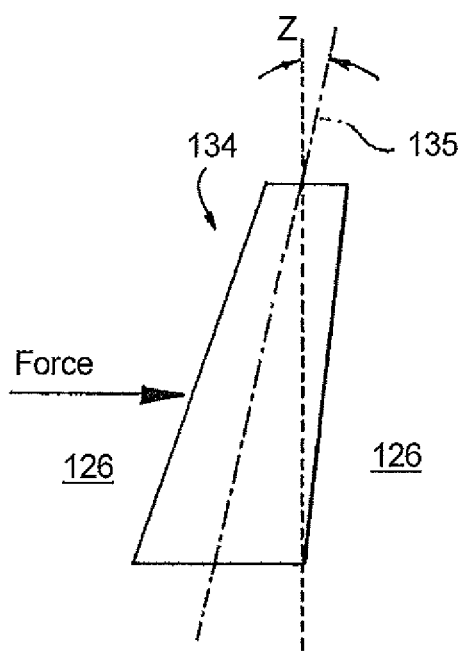
*Fig. 7*  *Fig. 8*

MEMS GYROS WITH QUADRATURE REDUCING SPRINGS

BACKGROUND OF THE INVENTION

1. Field of the Invention

The present invention relates to spring set configurations for microelectromechanical systems (MEMS) devices, and more particularly to spring set configurations for MEMS gyros.

2. Description of Related Art

A variety of gyroscope devices are known for providing navigational guidance such as in aerospace applications. Microelectromechanical systems gyroscopes (hereinafter MEMS gyros) are known for their compact size and relatively low cost of manufacture. In addition to aerospace applications, the small size and low cost of MEMS gyros lends them well to a variety of other applications including motion sensing for image stabilization and input devices, for example.

Gyros operate by moving a mass. When the mass is located in a rotating reference frame, for example, it will be subjected to a Coriolis force calculated by the formula:

$$F_c = 2mv \times \Omega,$$

where $F_c$ is the Coriolis force, m is the mass of the moving body, v is the velocity vector for the rotating body, and $\Omega$ is the angular velocity vector for the rotating body. Conventional spinning mass gyros generate large Coriolis forces by spinning at high velocities. MEMS gyros typically do not have bearings on which they can continually spin. Instead, MEMS microstructures create motion by vibrating a mass. When the mass is vibrated at its natural frequency, large amplitudes can be achieved with minimal excitation. When this driven mode is excited in a rotating reference frame, the resulting Coriolis force will be perpendicular to the driven mode direction due to the cross product of the velocity and angular velocity vectors in the formula above. This motion in the perpendicular direction is what is sensed to determine rotational rate of the reference frame. The mass is driven at its drive resonance frequency, thus the sensed motion will also vibrate at the same frequency but in an orthogonal direction. If the microstructure is designed such that the sensed motion natural frequency is close to the driven frequency, the resulting motion will be gained dynamically. The amount of this dynamic gain (Q) can be described by $$Q = \omega_{drive} / \Delta \omega,$$

where $\omega_{drive}$ is the driven frequency and $\Delta \omega$ is the difference in frequency between the driven and sensed modes. The motion can be sensed and driven capacitively.

$\Delta \omega$ is a key parameter for resonant gyros. The smaller the value of $\Delta \omega$, the greater the gain. But this increased gain comes at a cost in the form of decreased bandwidth of rotation that can be detected. Since $\Delta \omega$ is the difference between the sense and drive frequencies, small variations in these nominal frequencies can cause relatively large fluctuations in $\Delta \omega$. Therefore, consideration must be made to ensure that process variations affect both sense and drive frequencies in the same or similar amounts.

A typical example of such a MEMS gyro includes a microstructure that is driven in-plane, oscillating about the z-axis. If the reference frame is rotated about the x or y-axis, Coriolis motion will be produced about the y or x-axis, respectively. Such a gyro can be optimized to sense reference frame rotations about only one axis, for example the x-axis. This is achieved by placing the majority of the mass close to the x-axis and as far from the y-axis as possible. This minimizes the moment of inertia about the x-axis and maximizes the moment of inertia about the y-axis. This also makes the lowest resonant mode the desired y-axis rotation. Electrodes with opposite polarity (high and low bias) are placed under the microstructure on either side of the y-axis so when the capacitance is changed a current is generated that can be converted to a voltage with a charge amplifier. If the microstructure were to rotate about the x-axis, there would be no net current generated because both capacitances would change equally.

In ideal operation, a point "p" on the end of the drive motor will move back and forth in the y-direction as the gyro is driven. If the reference frame is not rotating, the point p will only move in the y-direction and will not move in the z-direction. When the reference frame rotates about the x-axis, a Coriolis force is generated proportional to the velocity in the z-direction according to the formula for calculating $F_c$ above. The motion generated is proportional to the Coriolis force.

Quadrature motion is generated when point p moves in the z-direction in its driven mode. This results in a driven motion that is 90 degrees out of phase with the rate rotation sense signal. The signal from the gyro is sinusoidal at the driven frequency with phase components from both the desired rotation rate signal and from the quadrature. The two phases of the signal are decoupled by a demodulation circuit. The demodulation circuit provides an output signal that includes an average amplitude of the in-phase rate signal as well as the out of phase quadrature signal. The in-phase rate signal is the desired output signal the gyro is designed to sense.

When an unwanted quadrature signal is too large, it can cause the charge amplifier to clip and any information of the desired rate signal is clipped along with it. Electrical mitigation circuits have been utilized to reduce this effect of quadrature error on the desired rate signal. Typical quadrature error mitigation circuits work by applying both high and low bias voltages on compensation electrodes. This generates a current with the in-plane driven motion having the same phase as the unwanted quadrature. By applying a compensation voltage bias, the quadrature mitigation circuit can minimize the unwanted quadrature signal. The amount of compensation voltage bias needed to minimize the unwanted quadrature signal is an indicator of how far the microstructure is tipping out of plane. Design improvement can be measured by how much compensation voltage is reduced. The quadrature error mitigation circuit is limited by the available voltage. It is not uncommon for quadrature error to be so large that it cannot be corrected with a quadrature error mitigation circuit. Some gyro designs have larger compensation electrodes so that more current can be generated and larger quadrature error signals can be minimized. Larger compensation voltages may result in unacceptable noise levels in the device. Minimizing unwanted quadrature by electrical means can make the microstructure useable, but high level performance characteristics such as Allan variance and temperature sensitivity may be compromised since they have been correlated to compensation voltage levels, probably due to the microstructure moving out of plane.

A primary cause of quadrature error is the etch angle variation in the microstructure components, and particularly in the springs. An ideal orthogonal spring will move in the direction it is forced, but when there is an etch angle producing an angled neutral axis (for instance a parallelogram cross-section), i.e., a tilt of some degree, the spring will also move out of plane to the forcing direction.

Deep reactive-ion etching (DRIE) tools are state of the art tools typically used to construct MEMS devices. DRIE tools use etch chemistry in a directional plasma to etch silicon vertically. These tools can have a radial center-to-edge variation in etched angle due to edge effects of the plasma. The orientation of the etch angle can be dependent on where the die is located on the wafer with the straightest edges (least tilt) being produceable only in a correlated portion of the wafer.

The driven mode is affected by both the orientation and magnitude of the etch angle. When the etch angle direction is orthogonal to the spring direction, it maximizes the out of plane component of motion. When the etch angle direction is the same as the spring direction, there is little effect. When an etch angle is present on the gyro in the y-direction, the out of plane component is generated by the spring component in the x-direction, and this causes a rotation about the y-axis. The opposite is true for etch angles in the y-axis in that they generate an out of plane motion about the x-axis. Only out of plane motions about the y-axis produce a signal, and thus quadrature, as described above.

The magnitude of quadrature displacement is affected by the differences in natural frequencies of the quadrature mode and the driven mode. In the same way that the gyro output is gained dynamically due to the sense mode being close to the driven mode, the quadrature motion is also gained. X-direction etch angles cause out of plane motion about the x-axis. Since this mode is far from the driven frequency, there is not much dynamic gain present. This motion does not generate an electrical current since the out of plane capacitors change equally. However, y-direction etch angles cause out of plane motion about the y-axis. This mode is intentionally close to driven mode because it is needed to amplify the desired Coriolis motion. Consequently, the quadrature motion about the y-axis is amplified by its dynamic gain (Q), and its motion produces an electrical quadrature signal.

Such conventional methods and systems have generally been considered satisfactory for their intended purpose. However, there is still a need in the art for spring set configurations on MEMS devices and particularly on MEMS gyros that allow for reduced sensitivity to etch angle errors (or inaccuracies) due to processing variations. There also remains a need in the art for such MEMS devices and MEMS gyros that are easy to make and use. The present invention provides a solution for these problems.

SUMMARY OF THE INVENTION

The subject invention is directed to new and useful spring set configurations for MEMS devices, and in particular MEMS gyros for sensing rotation. A MEMS gyro includes a drive motor defining orthogonal x, y, and z-axes. In certain embodiments, the drive motor is configured to oscillate a suspended drive mass around the z-axis with oscillating motion substantially in a plane with the x and y-axes. A plurality of drive springs connect the suspended drive mass to an intermediate suspended mass concentric with the suspended drive mass. Each drive spring has a spring element anchored to the intermediate suspended mass at a first anchor point and anchored to the suspended drive mass at a second anchor point. The first and second anchor points are located on a respective off-axis common radius originating at the z-axis, meaning that the common radius is not oriented along the x or y-axes.

In certain embodiments, the MEMS gyro further includes a pedestal mass connected to an underlying substrate. The pedestal mass and intermediate suspended mass are connected by a plurality of anchor springs. Each anchor spring has a spring element anchored to the intermediate suspended mass at a first anchor point and anchored to the pedestal mass at a second anchor point. It is also contemplated that at least one of the first and second anchor points of each anchor spring can be located on an off-axis common radius originating at the z-axis with the first and second anchor points of a respective one of the drive springs. For example, the second anchor point of each anchor spring can be located on the common off-axis radius. It is contemplated that the intermediate suspended mass can be located radially inward of the suspended drive mass, and that the pedestal mass can be located radially inward of the intermediate suspended mass. However, any other suitable ordering of the masses or additional masses can be used without departing from the spirit and scope of the invention. For example, the pedestal mass can be radially outward of the intermediate suspended mass, which can be radially outward of the suspended drive mass. Additionally, it is contemplated that a MEMS device having a single mass connected to a substrate by a set of advantageously configured springs may be used without departing from the spirit and scope of the invention.

It is contemplated that the anchor springs can be predominantly compliant in rotation about the y-axis and resistant to motion in all other directions. The drive springs can similarly be predominantly compliant in rotation about the z-axis and resistant to motion in all other directions.

In certain embodiments, the suspended drive mass and the intermediate suspended mass are separated by a plurality of trenches, which can have a substantially constant width. The spring element of each drive spring can have a width greater than that of the spring element of each anchor spring. The anchor springs can be predominantly curved and the drive springs can be predominantly straight. The mass of each spring element can be advantageously distributed substantially equally across the respective off-axis common radius of the first and second anchor points thereof to reduce off-axis sensitivities. It is also contemplated that the length of each spring element can be distributed substantially equally across the respective off-axis common radius.

The invention also provides a spring set for a MEMS device wherein the spring element of each drive spring is predominantly oriented parallel to the y-axis. It is contemplated that the spring element of each drive spring can include a plurality of straight sections each oriented substantially parallel to the y-axis.

The invention also provides a spring set configuration for a MEMS device wherein each spring has a spring element with a cross-section having an etch angle that is in line or oblique with respect to the z-axis. The springs can impart a characteristic quadrature error, or out of plane motion, to the suspended mass or masses due to variations in etch angle. It is contemplated that the quadrature error due to process variations in the etch angle of springs which are in line or oblique with respect to the z-axis can be reduced by a factor of about 5 times or greater compared with traditional spring set configurations having similar process variations in etch angle. It is also contemplated that the characteristic quadrature error or out of plane motion can be substantially insensitive to process induced etch angle variation in the spring elements.

It is contemplated that in certain embodiments, the cross-section of each spring element is substantially in the shape of a parallelogram. It is also contemplated that the cross-section of each spring element can be substantially in the shape of a trapezoid with two parallel edges orthogonal to the z-axis and with two oblique edges oblique with respect to the z-axis. The average angle of each of the two oblique edges can be oblique with respect to the z-axis. It is also contemplated that the cross-section of each spring element can be any arbitrary shape with a parallel or an oblique neutral axis with respect to the z-axis.

The invention also provides a spring set for a MEMS device, including a plurality of springs connecting a first mass to a seconds mass. In certain embodiments, each spring has a spring element anchored to the first mass at a first anchor point and anchored to the second mass at a second anchor point. The first and second anchor points of each spring element are located on a respective common vector that is oblique with respect to orthogonal x and y-axes defined by the first and second masses. Each spring can have a mass and/or length that is balanced about the respective common vector. In accordance with certain embodiments, each spring has a spring element predominantly oriented parallel to a common y-axis. It is also contemplated that in certain embodiments, the first mass defines a plane of motion. Each drive spring includes a spring element with a cross-section having a process induced etch angle that is oblique with respect to a z-axis orthogonal to the plane of motion. The drive springs impart a characteristic component of motion out of the plane of motion to the second mass that is substantially insensitive to variation in the process induced etch angle of the spring elements. It is also contemplated that the first or second mass may be the substrate when applied to a MEMS process.

It is contemplated that one or more additional masses can each be connected to another one of the masses by a respective plurality of springs. The plurality of springs can be arranged with quarter symmetry about a z-axis that is orthogonal to the axes or plane of the first body.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the all to which the subject invention appertains will readily understand how to make and use the devices and methods of the subject invention without undue experimentation, preferred embodiments thereof will be described in detail herein below with reference to certain figures, wherein:

FIGS. 5-7 are cross-sectional elevation views of portions of MEMS device spring elements constructed in accordance with the subject invention, showing different etch angles arising from process variations, wherein each cross-section is in the shape of a parallelogram;

FIG. 8 is a cross-sectional elevation view of a portion of a MEMS device spring element constructed in accordance with the subject invention, showing a trapezoidal cross-section in which two different etch angles are present on opposite sides of the spring element, and wherein the average etch angle is itself oblique with respect to the z-axis;

DETAILED DESCRIPTION OF THE PREFERRED EMBODIMENTS

Figure 2:
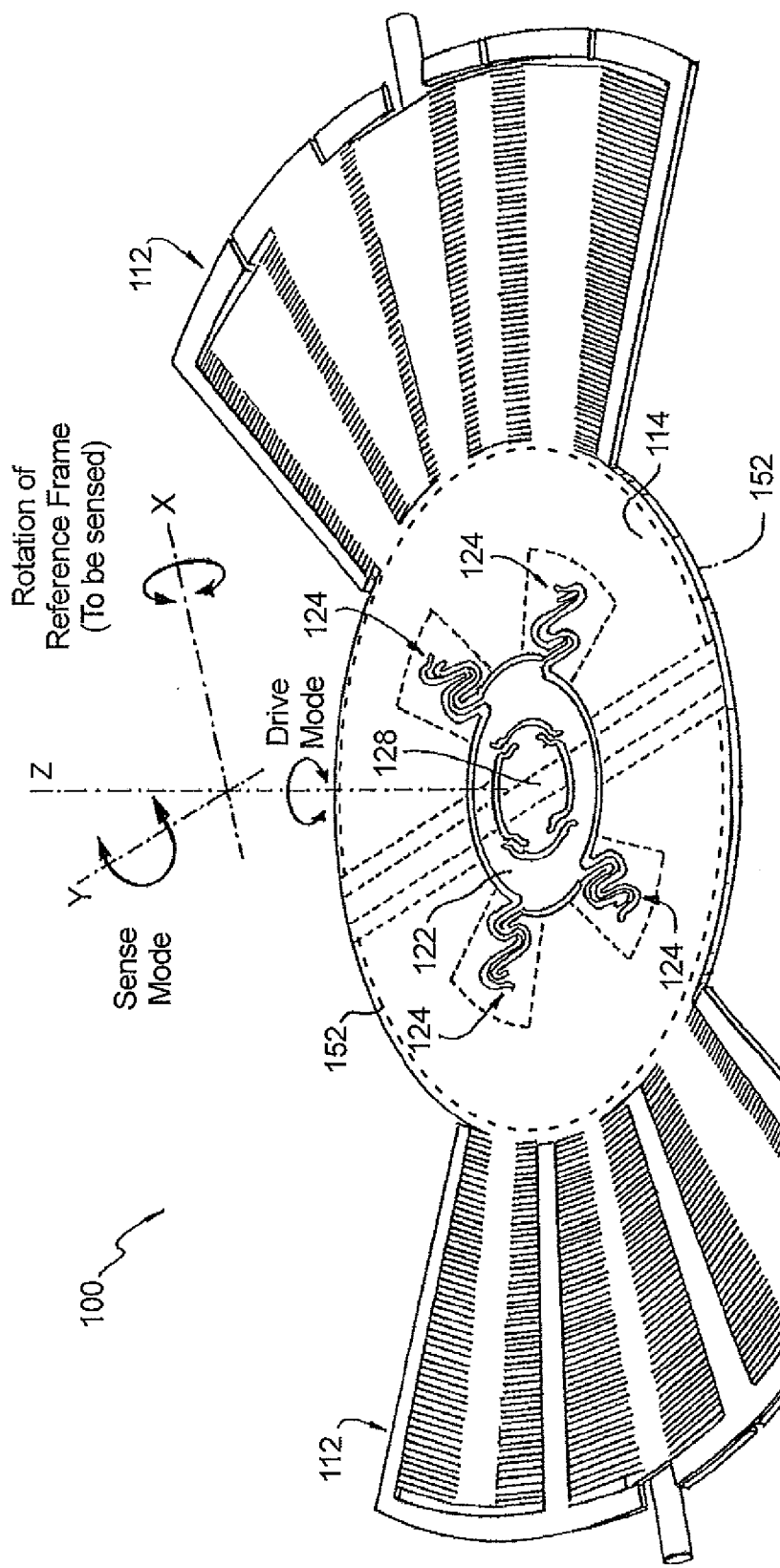
FIG. 2 is a perspective schematic view of an exemplary embodiment of a MEMS gyro constructed in accordance with the present invention, showing the orientation of the spring set of the invention, the drive mass, suspended intermediate mass, and pedestal with respect to the x-, y-, and z-axes.

Reference will now be made to the drawings wherein like reference numerals identify similar structural features or aspects of the subject invention. For purposes of explanation and illustration, and not limitation, a partial view of an exemplary embodiment of a spring set configuration used on a MEMS gyro in accordance with the invention is shown in FIG. 2 and is designated generally by reference character 100. Other embodiments of spring set configurations used on MEMS gyros in accordance with the invention, or aspects thereof, are provided in FIGS. 3-13, as will be described. The systems and methods of the invention can be used reduce quadrature error in MEMS devices, and more particularly in MEMS gyros.

Figure 1A:
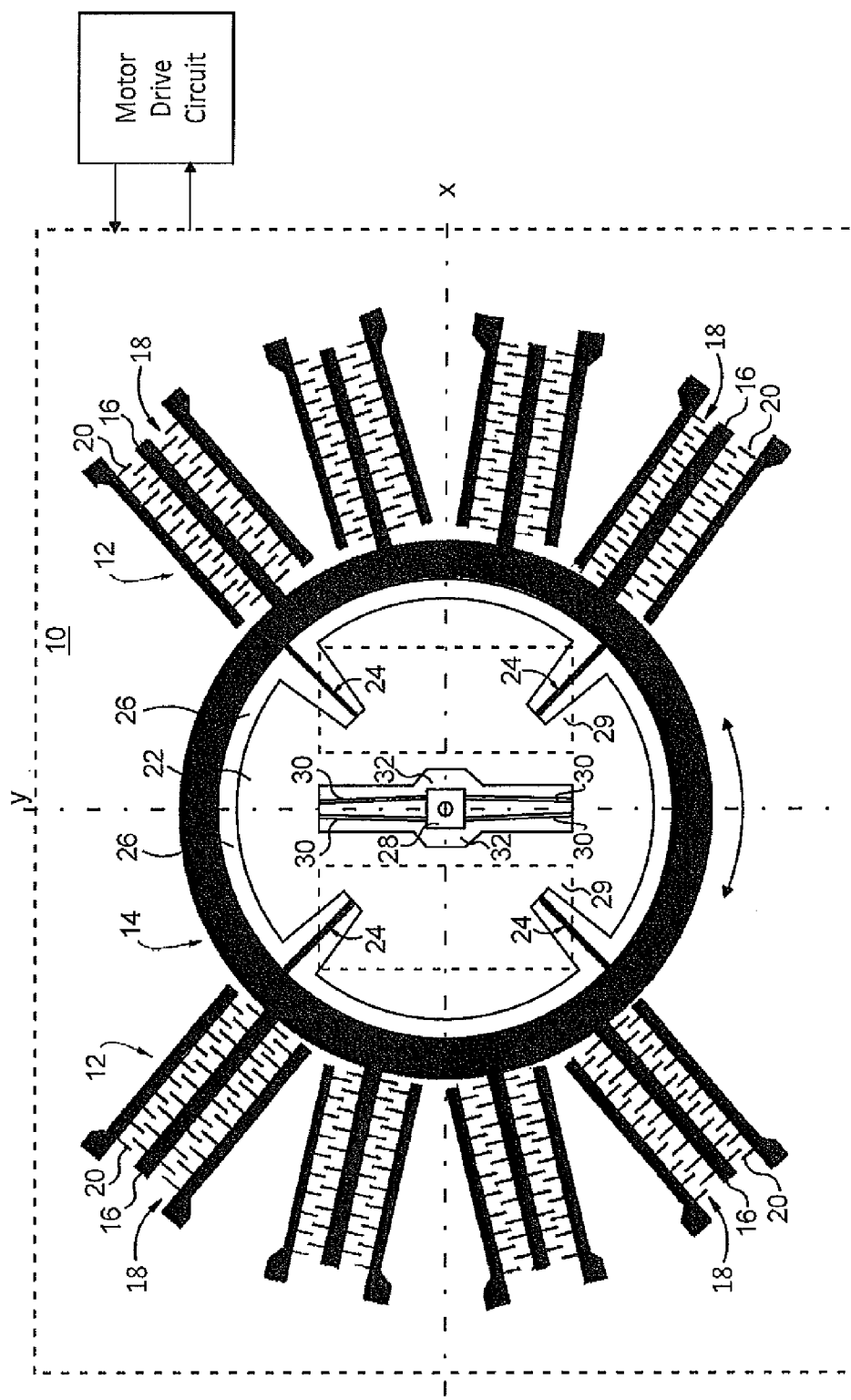
FIG. 1A is a plan view of an exemplary MEMS gyro typical of the prior art exhibiting a set of springs that result in typical high sensitivity to quadrature error, showing the drive mass connected to the intermediate suspended mass by four drive springs and a central pedestal mass connected to the intermediate suspended mass by four anchor springs.

With reference to FIG. 1A, a portion of a prior art MEMS gyro 10 is shown in plan view. MEMS gyro 10 includes an opposed pair of comb drives 12. A drive mass 14 includes driven portions 16 that form part of comb drives 12, with intermeshing portions 18 formed between stationary portions 20 of comb drives 12 and driven portions 16. When oscillating electrical charges are applied across intermeshing portions 18, oscillating motion is imparted to drive mass 14 in the direction indicated in FIG. 1A by double arrows. This oscillating motion is rotation about the z-axis, which is oriented into and out of the view plain of FIG. 1A (see FIG. 2 for a perspective view of a z-axis).

Inboard of drive mass 14 is an intermediate suspended mass 22 that is connected to drive mass 14 by four drive springs 24 formed by etching trenches 26 between drive mass 14 and intermediate suspended mass 22. Inboard of intermediate suspended mass 22 is a pedestal mass 28 that is anchored to the underlying substrate and is connected to intermediate suspended mass 22 by anchor springs 30 formed by etching trenches 32 between pedestal mass 28 and intermediate suspended mass 22. Drive springs 24, anchor springs 30, intermediate suspended mass 22, and drive mass 14 are dimensioned to achieve the desired out of plane resonant frequency. Drive springs 24 and drive mass 14 are dimensioned to achieve the desired in plane (drive) resonant frequency. Comb drives 12 operate at this natural frequency to maintain the desired in plane driven motion.

While comb drives 12 are imparting rotational motion on drive mass 14, rotation of the reference frame will give rise to a Coriolis force, tending to rotate both drive mass 14 and intermediate suspended mass 22 out of plane, in a direction orthogonal to both the driven motion and the reference frame rotation. Capacitor plates 29 mounted proximal to (above or beneath) intermediate suspended mass 22 and/or drive mass 14 (indicated by broken lines in FIG. 1A) make it possible to sense the out of plane displacement of intermediate suspended mass 22 and/or drive mass 14, and thereby sense rotation of the reference frame.

With continued reference to FIG. 1A, the mass of drive mass 14 is distributed as close to the x-axis (the sense axis) and as far from the y-axis (the non-sensing axis) as possible. This distribution desensitizes MEMS gyro 10 to reference frame rotation about the non-sensing y-axis and sensitizes it to reference frame rotation about the desired x-axis. It is desirable for MEMS gyros to be particularly sensitive to motion in only one axis so that motion in multiple directions can be resolved using separate MEMS gyros. For example, using three MEMS gyros 10 oriented orthogonal to one another, it is possible to resolve magnitude and direction of reference frame rotation in any arbitrary direction by sensing x, y, and z-components of rotation on the individual MEMS gyros.

Figure 9:
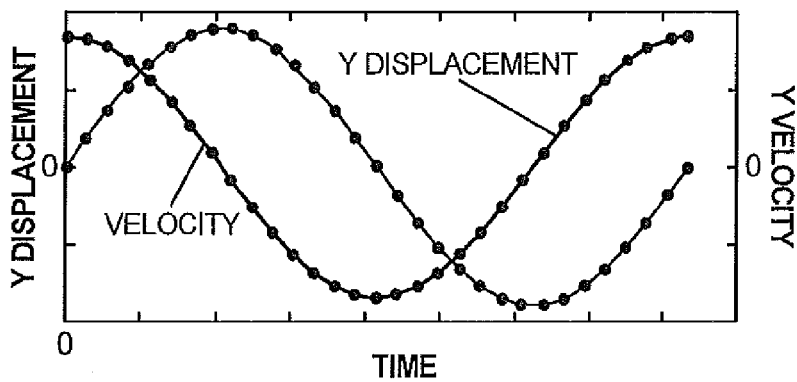
FIG. 9 is a plot showing velocity and displacement in the y-direction as a function of time for a point P on an ideal MEMS gyro.

Ideally, when MEMS gyro 10 is operating without reference frame rotation, drive mass 14 will oscillate in plane with the rest of MEMS gyro 10. This direction of motion is called the driven mode and is represented in FIG. 9 by the y displacement and velocity curves and in FIGS. 10 and 11 by the flat lines at zero z-displacement. However, in practice the formation of trenches 26 and 32, such as by state of the art DRIE etching techniques, is imperfect. Rather than forming trenches that are perfectly vertical with respect to the plane of MEMS gyro 10, known etching processes have variation that may impart an undesirable etch angle. The result is that the spring elements of drive springs 24 and anchor springs 30, when viewed in cross-section, are not rectangular as shown in FIG. 6, but are instead non-ideal shapes such as parallelograms or trapezoids as indicated in FIGS. 5, 7, and 8.

Figure 10:
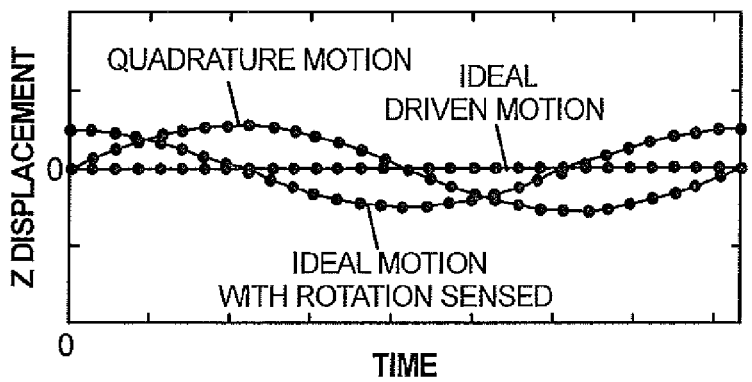
FIG. 10 is a plot showing displacement in the z-direction as a function of time for a point P on an ideal MEMS gyro, also showing the ideal z-direction displacement with rotation sensed, and showing typical z-direction displacement with quadrature motion.

Since the cross-sections of drive springs 24 and anchor springs 30 are not ideal vertically oriented rectangles, drive springs 24 and anchor springs 30 cause out of plane motion giving rise to quadrature error as described above. This undesired quadrature motion is represented in FIG. 10 by the quadrature motion curve and in FIG. 11 by the angled quadrature motion line. FIG. 10 shows the quadrature motion curve is 90 degrees out of phase with the ideal motion with rotation sensed curve.

Figure 11:
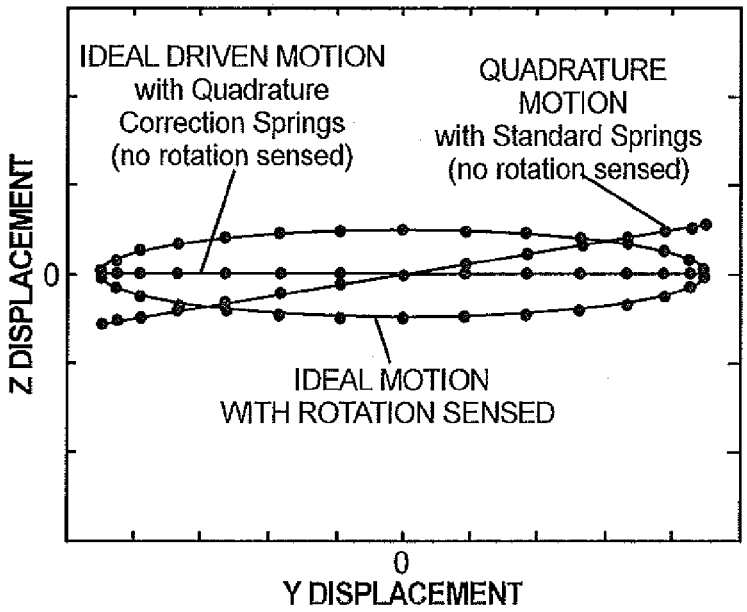
FIG. 11 is a plot showing displacement in the z and y-directions for a point P under ideal driven motion, ideal sensed motion, and driven motion with quadrature.

Ideally, when MEMS gyro 10 operates in a rotating reference frame, the Coriolis force on drive mass 14 causes it to oscillate out of plane, in what is called the sense mode. This ideal sense mode motion is represented in FIGS. 10 and 11 by the curves indicated for ideal motion with rotation sensed. However, in practice the quadrature error upsets this ideal motion, causing an extra out of phase signal which corrupts the desired signal.

Figure 1B:
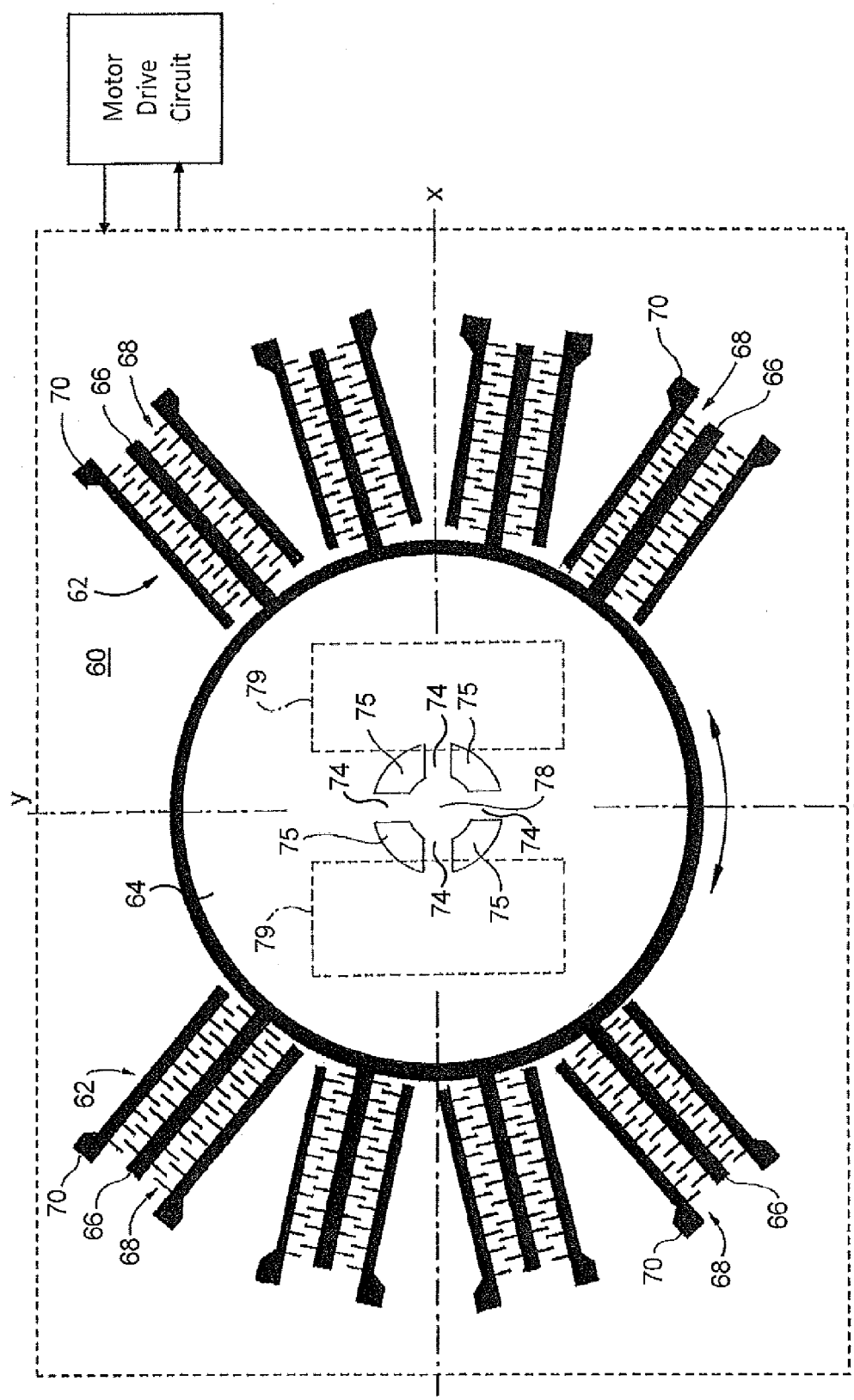
FIG. 1B is a plan view of another exemplary MEMS gyro typical of the prior art exhibiting a set of springs that result in typical high sensitivity to quadrature error, showing the drive mass connected to the pedestal by a spring set with four springs.

With reference now to FIG. 1B, another exemplary MEMS gyro 60 typical of the prior art is shown, having another spring set configuration that results in typical high sensitivity to quadrature error. MEMS gyro 60 includes an opposed pair of comb drives 62, drive mass 64 including driven portions 66 that form part of comb drives 62, with intermeshing portions 68 formed between stationary portions 70 of comb drives 62 and driven portions 66, much as described above with respect to MEMS gyro 10. Unlike MEMS gyro 10 described above, MEMS gyro 60 does not include an intermediate suspended mass. Rather, MEMS gyro 60 includes a single driven mass, namely drive mass 64, which is connected directly to pedestal 78 mass by a spring set with four springs 74. Springs 74 are formed by removal of material from trenches 75. Capacitor plates 79 operate much as capacitor plates 29 described above. Even without an intermediate suspended mass, etch angle variation in forming springs 74 causes out of plane motion on the single drive mass 64 resulting in quadrature error, much as described above with respect to MEMS gyro 10.

Referring now to FIG. 2, the subject invention is directed to new and useful configurations of spring sets on MEMS devices, particularly MEMS gyros for sensing rotation, such as MEMS gyro 100. MEMS gyro 100, depicted in reference to orthogonal x, y, and z axes, includes a drive motor in the form of opposed comb drives 112, with driven portions, intermeshing portions, and stationary portions like those of comb drives 12 described above. Comb drives 112 are configured to oscillate suspended drive mass 114 around the z-axis with oscillating motion substantially in a plane with the x and y-axes when there is no reference frame rotation. Four drive springs 124 connect suspended drive mass 114 to an intermediate suspended mass 122 that is concentric and substantially in plane with suspended drive mass 114.

Figure 3:
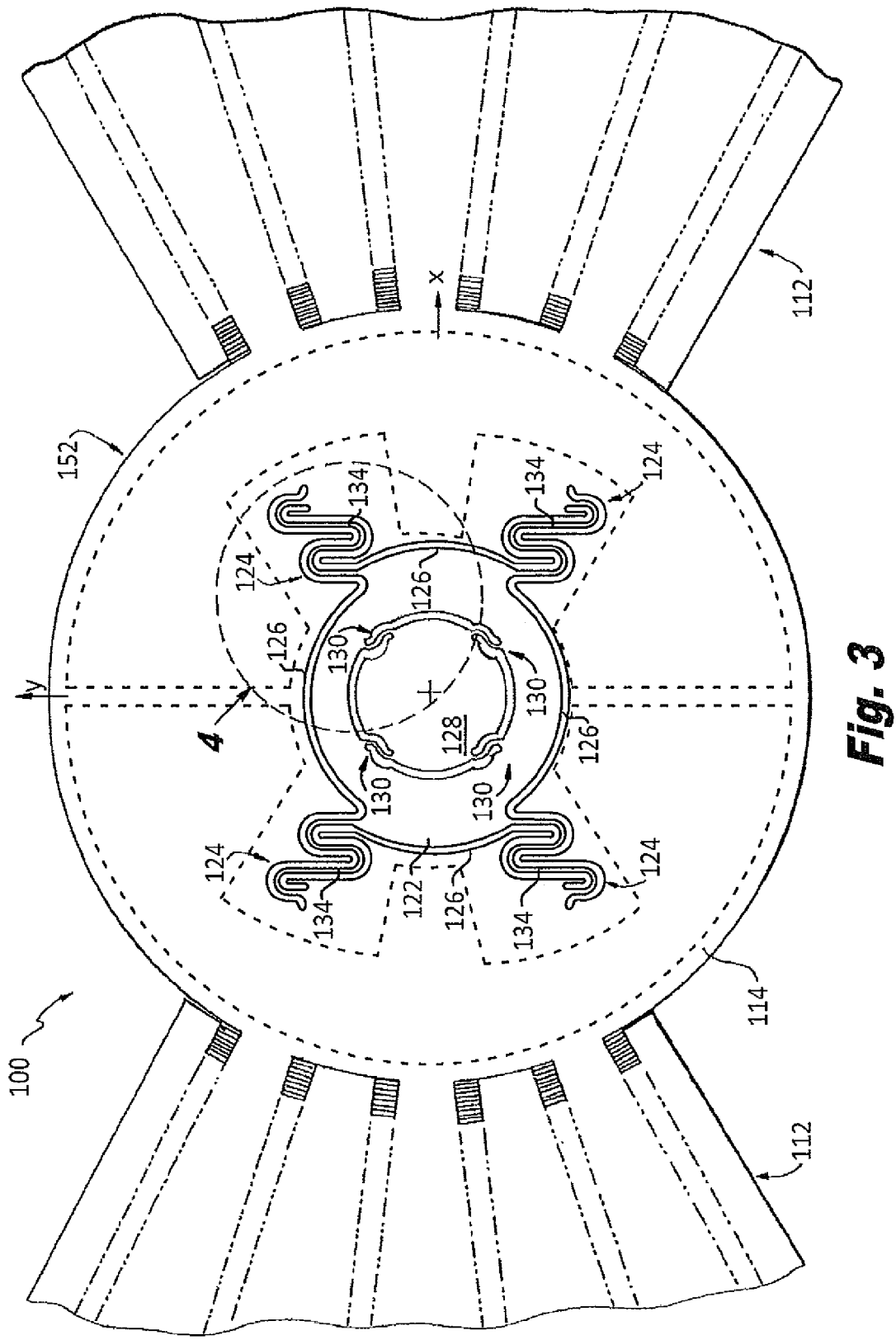
FIG. 3 is a plan view of a portion of the MEMS gyro of FIG. 2, showing the four drive springs aligned with the y-axis.
Figure 4:
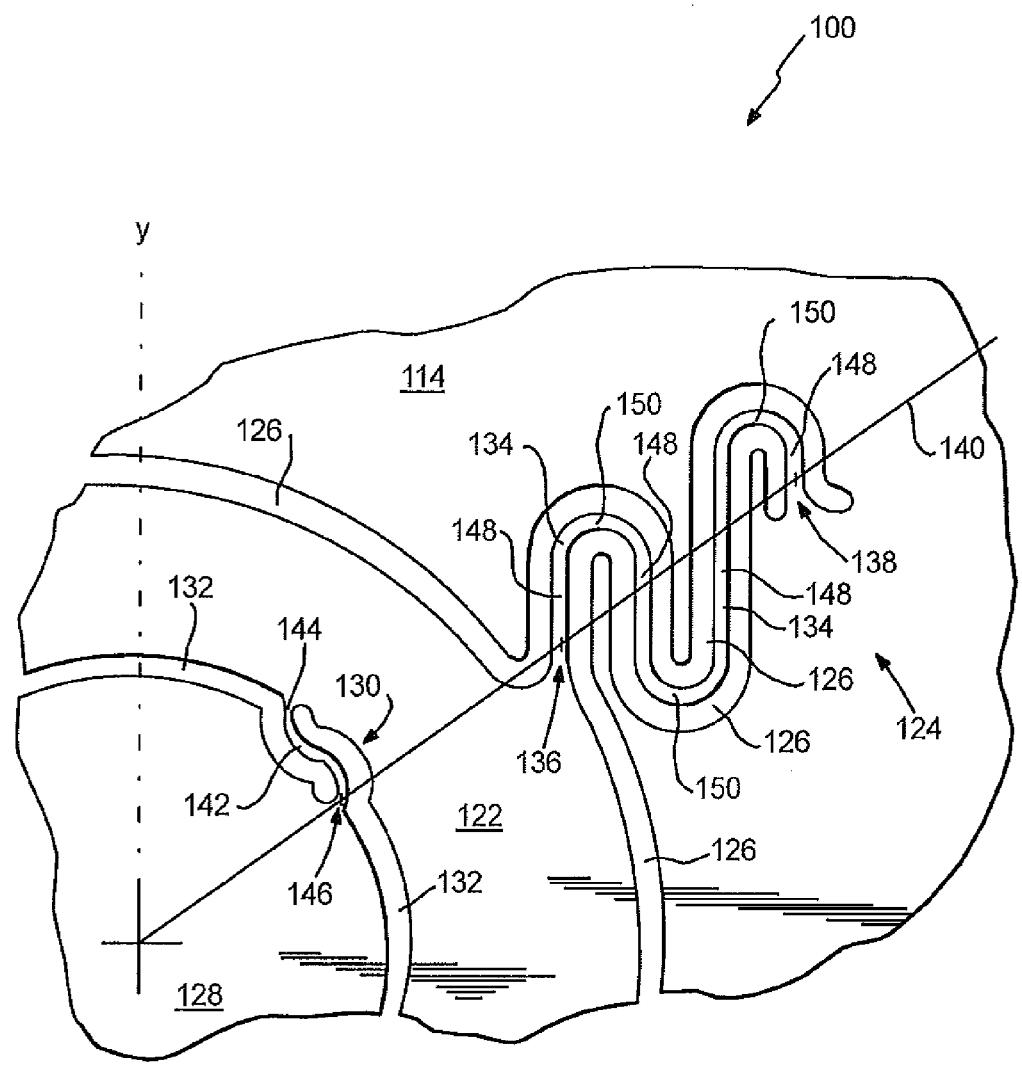
FIG. 4 is an enlarged plan view of a the portion of the MEMS gyro indicated in FIG. 3, showing the alignment of spring anchor points along an off-axis common radius originating at the z-axes.

Referring now to FIGS. 3 and 4, each drive spring 124 is anchored to intermediate suspended mass 122 at a first anchor point 136 and anchored to suspended drive mass 114 at a second anchor point 138. The first and second anchor points 136, 138 are located on a respective common radius 140 originating at the z-axis. This alignment makes drive springs 124 compliant to rotation motion about the z-axis, i.e., the drive mode, and makes them resistant to motion in all other directions including translation.

MEMS gyro 100 further includes a pedestal mass 128 connected to an underlying substrate. Pedestal mass 128 and intermediate suspended mass 122 are connected by four anchor springs 130. Each anchor spring 130 is anchored to intermediate suspended mass 122 at a first anchor point 144 and anchored to pedestal mass 128 at a second anchor point 146. Anchor point 146 of each anchor spring 130 is located on the off-axis common radius 140 with the first and second anchor points 136, 138 of a respective drive spring 124, meaning that common radius 140 is not oriented along the x or y-axis. It is also possible to configured the anchor springs with anchor point 144 located on the common radius 140 with the first and second anchor points 136, 138 of a respective drive spring 124. It is also possible to configure the anchor springs with both anchor points thereof located on the respective off-axis common radius without departing from the spirit and scope of the invention. Anchor springs 130 are formed between trenches 132 similar to and simultaneously with trenches 126 of drive springs 124. The shape and placement of anchor springs 130 make them compliant to rotational motion about the y-axis, i.e., the sense mode, and makes them resistant to motion in other directions.

Suspended drive mass 114 and intermediate suspended mass 122 are separated by a plurality of trenches 126, which have a substantially constant width. Constant width trenches minimize DRIE etch variation, for example, by introducing equal amounts of exposed silicon around key features during etching. Those skilled in the art will readily appreciate that other configurations having variable trench widths are also possible without departing from the spirit and scope of the invention. Spring element 134 of each drive spring 124 has a width greater than the width of spring elements 142 of anchor springs 130. However, those skilled in the art will readily appreciate that other configurations wherein the drive springs and anchor springs are the same size, or wherein the anchor springs are wider than the drive springs, are also possible without departing from the spirit and scope of the invention.

Anchor springs 130 are predominantly curved, whereas drive springs 124 are predominantly straight. Each spring element 134 of drive spring 124 has four straight sections 148 connected in series by three semi-circular curved sections 150. Those skilled in the art will readily appreciate that any suitable number of straight sections and curved sections can be used without departing from the spirit and scope of the invention. The straight sections 148 of each drive spring 124, which predominate the length of spring elements 134, are aligned parallel with the y-axis. Y-axis oriented drive springs 124 reduce unwanted quadrature motion derived from non-orthogonal spring etch angles due to process variation. FIG. 3 shows all four drive springs 124 aligned with the y-axis. The length and mass of each spring element 134 is advantageously distributed substantially equally across the respective common radius 140. This balance reduces off-axis sensitivities.

Referring now to FIGS. 5-8, exemplary cross-sections of spring elements 134 are shown, which can arise due to process variations when manufacturing MEMS gyros. FIG. 6 shows the design ideal, in which the etch angles of both trenches 126 defining spring element 134 are vertical, i.e., aligned to the z-axis, which is parallel to the z-axis shown in FIG. 2. FIGS. 5 and 7 show cross-sections of spring element 134 having parallelogram shapes where the etch angle of trenches 126 of spring element 134 are angled clockwise and counter-clockwise relative to the z-axis, respectively, due to unwanted process induced etch angle variations. FIG. 8 shows spring element 134 with a trapezoidal cross-section with trenches 126 on two different angles with respect to the z-axis. The average angle 135 of the two trenches 126 is itself oblique with respect to the z-axis. Unwanted process variations change the etch angle from the designed ideal and can result in undesired quadrature error, regardless of the designed ideal etch angle. Those skilled in the art will readily appreciate that process induced etch angle variation can be mitigated with the spring configurations described above regardless of the designed etch angle of a spring element with respect to the z-axis, without departing from the spirit and scope of the invention.

The same basic trench angle variation that may occur on drive springs 124 also applies to anchor springs 130. Variation in line widths causes the sense mode stiffness and driven mode stiffness to change differently, which causes significant variation in the key Δω parameter. Utilizing two sets of springs, e.g. drive springs 124 and anchor springs 130 helps assure that the driven and sense modes track properly. Drive springs 124 determine the driven mode stiffness while both drive springs 124 and anchor springs 130 define the sense mode stiffness. Anchor springs 130 have a smaller width than drive springs 124 and are curved to make them more sensitive to line width variation, such that both driven and sense modes have the same sensitivity to line width variation. Thus anchor springs 130 and drive springs 124 are tuned together to reduce Δω variation.

Exemplary design parameters for MEMS gyro 100 include driven and sense modes having the lowest resonant modes at around 6 KHz, tight tracking of Δω around 150 Hz, and high resonant frequencies of all other modes at greater than around 7.5 KHz. Those skilled in the art will readily appreciate that other suitable configurations can be practiced for specific applications without departing from the sprit and scope of the invention.

Due to their combination of geometries, spring elements having curved and straight sections, orientation of spring element anchor points with respect to the off-axis common radius, orientation of spring element segments with respect to a specific axis, balance of the length of spring elements about the off-axis common radius, and mass balance of spring elements about the off-axis common radius, drive springs 124 and anchor springs 130 impart a characteristic quadrature error mitigation to drive mass 114 that renders the output substantially insensitive to the process-induced etch angle variations of drive springs 124 and anchor springs 130, while maintaining the desired resonant modes. Therefore, MEMS gyro 100 results in consistently low quadrature error even with process variations in manufacturing causing undesirable etch angles. It is estimated that the quadrature error due to process variations in the etch angle in MEMS gyro 100 can be reduced by a factor of about 5 times or greater compared with a MEMS gyro employing traditional spring set configurations having similar process variations in etch angle. MEMS gyro 100 has a reduced quadrature error regardless of whether the cross-section of its drive springs 124 and/or anchor springs 130 are parallelogram shaped, trapezoid shaped, or any other shape with angled neutral axis.

Just as the described spring configuration reduces quadrature error, an intentional out of plane signal can be advantageously magnified. This can be used to intentionally induce out of plane motion.

Capacitor plates 152 are mounted under drive mass 114 as shown in FIG. 2. Those skilled in the art will readily appreciate that capacitor plates can be mounted proximal to (above or beneath) the top and/or bottom of intermediate suspended mass 122 and/or drive mass 114, without departing from the spirit and scope of the invention, since both intermediate suspended mass 122 and drive mass 114 can move out of plane in the presence of reference frame rotation. Those skilled in the art will readily appreciate that any suitable capacitor location can be used, or any other type of sensor besides capacitor type sensors can be used without departing from the spirit and scope of the invention.

As described above, intermediate suspended mass 122 is located radially inward of suspended drive mass 114, and pedestal mass 128 is located radially inward of intermediate suspended mass 122. However, those skilled in the art will readily appreciate that any other suitable configuration or ordering of the masses can be used without departing from the spirit and scope of the invention. For example, the pedestal mass can be radially outward of the intermediate suspended mass, which can be radially outward of the suspended drive mass. While described herein with the exemplary configuration having four each of drive springs and anchor springs, those skilled in the art will readily appreciate that any suitable number of drive or anchor springs can be used without departing from the spirit and scope of the invention. While described herein with the exemplary configuration having two suspended masses (intermediate suspended mass 122 and suspended drive mass 114), those skilled in the art will readily appreciate that any suitable number of suspended masses, including a single suspended mass or multiple suspended masses, can be used without departing from the spirit and scope of the invention. Similarly, those skilled in the art will readily appreciate that any suitable number of spring sets connecting masses to each other or to a substrate can be used without departing from the spirit and scope of the invention.

Compensation electrode authority can advantageously be combined with the features of drive springs 124 and anchor springs 130 to further reduce quadrature error. If used, the compensation electrode authority, or any other suitable means of electrically reducing quadrature error, should have enough authority to minimize expected quadrature error, but not so much that it adds a parasitic capacitance noise source.

Figure 12:
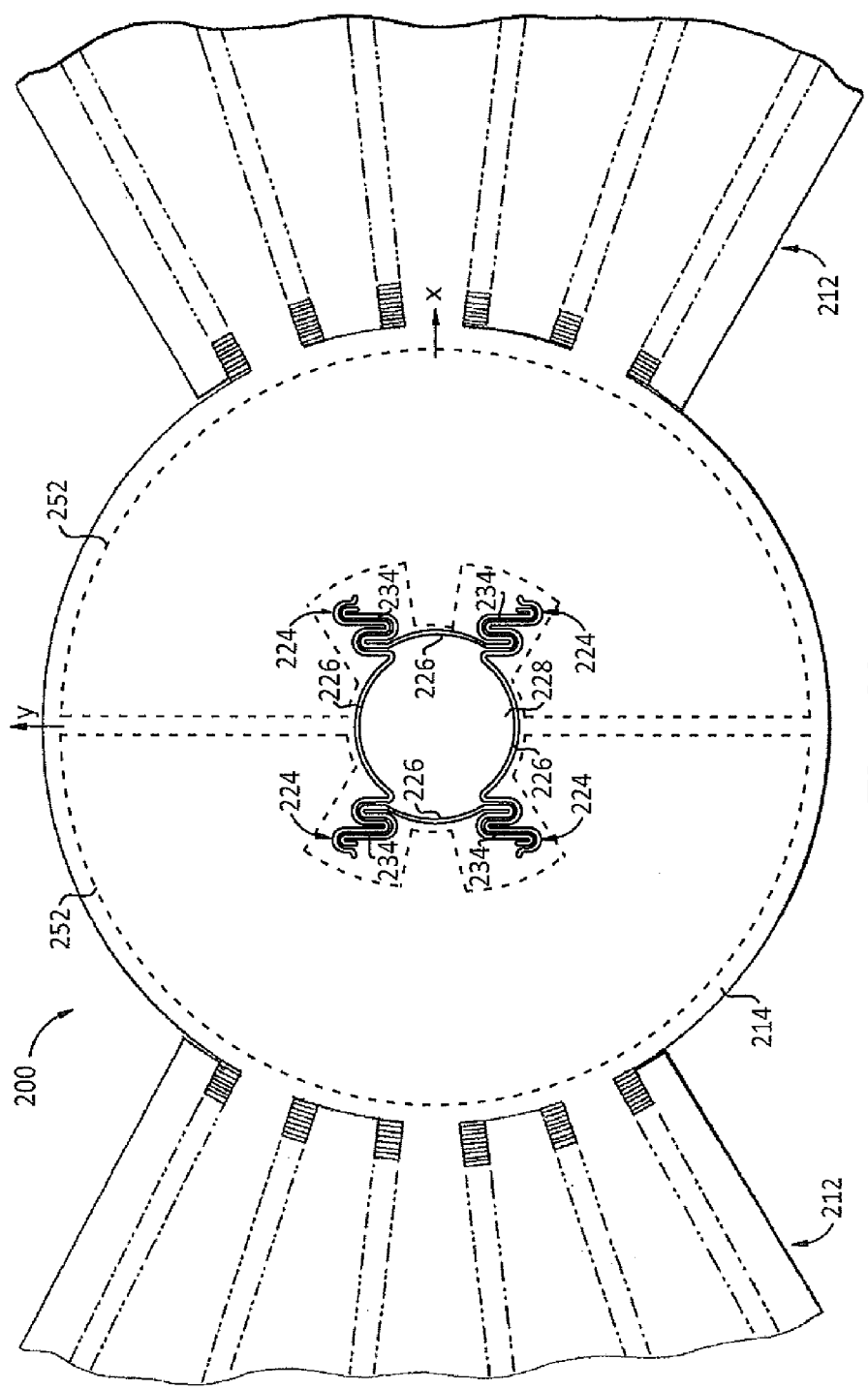
FIG. 12 is a plan view of another exemplary MEMS gyro constructed in accordance with the subject invention, showing a configuration with only one moving mass and only one spring set.

Referring now to FIG. 12, another exemplary embodiment of a MEMS gyro 200 is shown, in which there is no intermediate suspended mass. MEMS gyro 200 includes comb drives 212, drive mass 214, capacitor plates 252, pedestal mass 228, springs 224, trenches 226, and spring elements 234 much as described above with respect to MEMS gyro 100. With a single driven mass, namely drive mass 214, connected by a single set of springs 224 directly to pedestal mass 228, Coriolis forces can act on drive mass 214 as it oscillates about pedestal mass 228, moving capacitor plates 252 in the sense mode direction. Pedestal mass 228 can be part of or connected to the underlying substrate. The characteristics of springs 224, just as springs 124 described above, reduce sensitivity to etch process variation, e.g., reducing quadrature error. In applications where a certain component of out of plane motion is desired, springs 224 reduce process variation induced deviations from the desired out of plane motion, much like springs 124 above.

Figure 13:
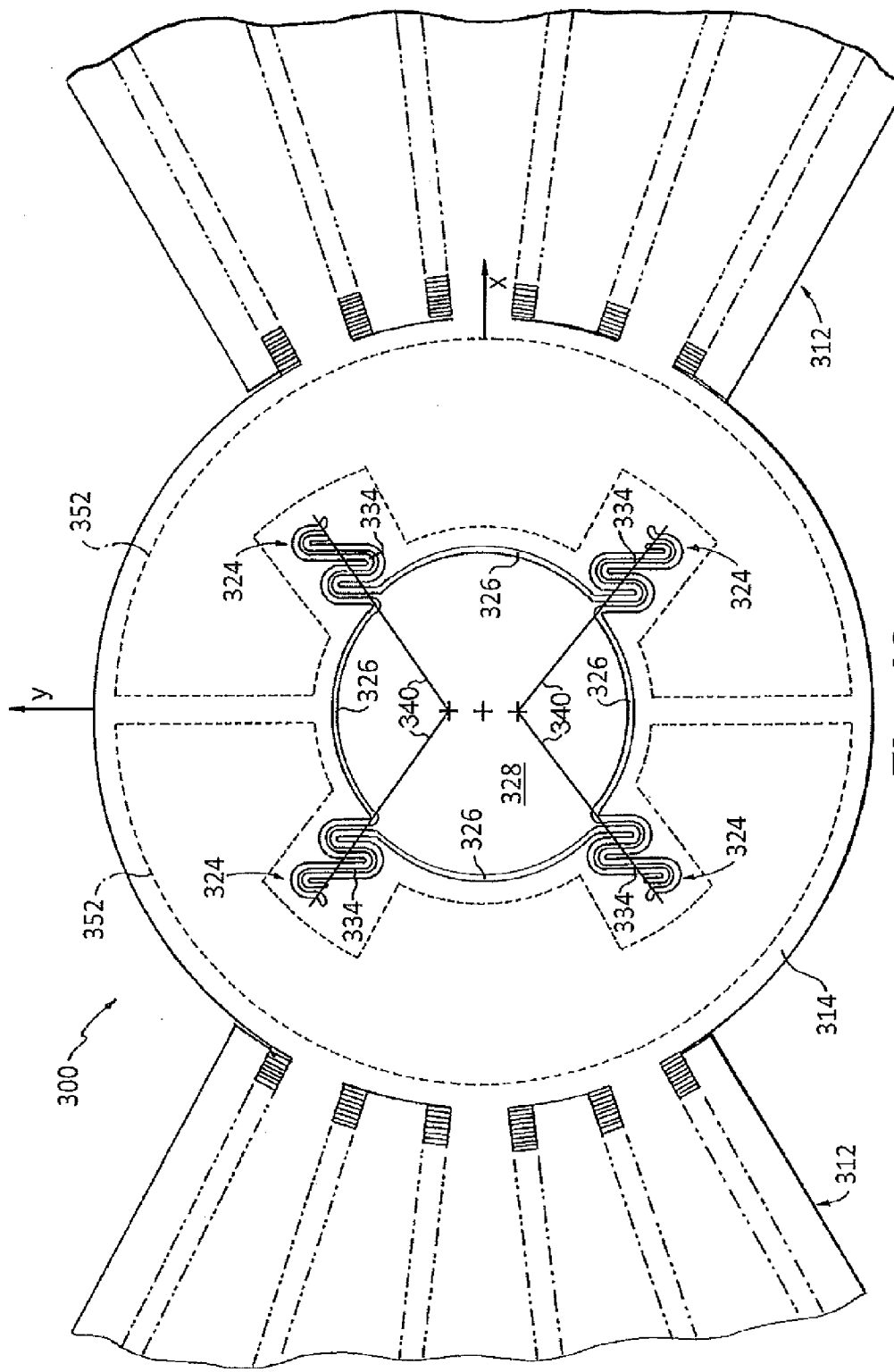
FIG. 13 is a plan view of another exemplary MEMS gyro constructed in accordance with the subject invention, showing a configuration in which the anchor points of each spring element lie on a common vector that is not a radius passing through the z-axis, and that is not parallel or orthogonal to the x and y-axes.

Spring elements 234 of springs 224 have anchor points (not shown in FIG. 12, but see, e.g., FIG. 4) that lie on a common off-axis radius for each spring 224, with respect to the x and y-axes. However, it is not necessary for the anchor points to lie on a radius. Referring now to FIG. 13, another exemplary embodiment of a MEMS gyro 300 is shown in which the anchor points do not lie on radii of the MEMS gyro. MEMS gyro 300 includes comb drives 312, drive mass 314, capacitor plates 352, pedestal mass 328, springs 324, trenches 326, and spring elements 334 much as described above with respect to MEMS gyro 200. The anchor points of each spring 334 lie on a vector 340 that is not a radius of MEMS gyro 200, i.e., the vectors 340 do not all intersect at the origin of the x and y-axes. Nonetheless, the spring set of MEMS gyro 200 has quarter symmetry, meaning the four springs 224 taken together exhibit symmetry across both of two orthogonal axes, in this case the x-axis and the y-axis. Vectors 340 also exhibit quarter symmetry, and are off-axis with respect to the x and y-axes as are common radii 140 described above, and as such vectors 340 are not parallel to or orthogonal to the x or y-axis or any other two orthogonal axes with the same origin as the x and y-axes. In this configuration, MEMS gyro 300 is not axially symmetric about the z-axis, nor is there rotational symmetry about the z-axis (the z-axis is not shown in FIG. 13, but see FIG. 2).

Having the anchor points of spring elements 334 arranged on vectors 340 provides essentially the same advantages described above with respect to MEMS gyros 100 and 200. While the spring set of MEMS gyro 300 has been shown in the exemplary context of a MEMS gyro with a single driven mass and spring set, those skilled in the art will readily appreciate that similar spring sets can be used in MEMS gyros with any number or driven or intermediate masses without departing from the spirit and scope of the invention.

The techniques and methods described herein effectively mitigate unwanted out of plane quadrature rotation along the y-axis in the driven mode and causes more out of plane rotation along the x-axis. This increase in x-axis rotation is not dynamically amplified, does not generate an electrical signal, and does not corrupt the desired output signal.

Those skilled in the art will readily appreciate that while discussed above in the exemplary context of DRIE tools, the invention can be practiced using any suitable tools without departing from the spirit and scope of the invention. Whether state of the art etching techniques such as in DRIE tools are used, or whether less precise techniques are used, the configurations described herein can yield reduced quadrature error over traditional spring set designs.

The methods and systems of the present invention, as described above and shown in the drawings, provide for spring set configurations for MEMS devices with superior properties including reduced quadrature error. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A MEMS gyro for sensing rotation comprising: a) a drive motor defining orthogonal x, y, and z-axes, the drive motor being configured to oscillate a suspended drive mass around the z-axis with oscillating motion substantially in a plane with the x and y-axes; and b) a plurality of drive springs connecting the suspended drive mass to an intermediate suspended mass concentric with the suspended drive mass, each drive spring having a spring element anchored to the intermediate suspended mass at a first anchor point and anchored to the suspended drive mass at a second anchor point, wherein the first and second anchor points are located on a respective common radius originating at the z-axis, wherein the common radius is off-axis from both the x and y-axes, wherein each spring element has a length that is distributed substantially equally across the respective common radius of the first and second anchor points thereof.

2. A MEMS gyro as recited in claim 1, further comprising a pedestal mass connected to an underlying substrate, wherein the pedestal mass and intermediate suspended mass are connected by a plurality of anchor springs, each anchor spring having a spring element anchored to the intermediate suspended mass at a first anchor point and anchored to the pedestal mass at a second anchor point.

3. A MEMS gyro as recited in claim 2, wherein the second anchor point of each anchor spring is located on the common radius with the first and second anchor points of a respective one of the drive springs.

4. A MEMS gyro as recited in claim 2, wherein the first anchor point of each anchor spring is located on the common radius with the first and second anchor points of a respective one of the drive springs.

5. A MEMS gyro as recited in claim 2, wherein the anchor springs are predominantly compliant in rotation about the y-axis and are resistant to motion in all other directions.

6. A MEMS gyro as recited in claim 5, wherein the drive springs are predominantly compliant in rotation about the z-axis and are resistant to motion in all other directions.

7. A MEMS gyro as recited in claim 2, wherein the spring element of each drive spring has a width greater than that of the spring element of each anchor spring.

8. A MEMS gyro as recited in claim 2, wherein the anchor springs are predominantly curved and wherein the drive springs are predominantly straight.

9. A MEMS gyro as recited in claim 1, wherein each spring element has a mass that is distributed substantially equally across the respective common radius of the first and second anchor points thereof.

10. A MEMS gyro for sensing rotation comprising:
a) a drive motor defining orthogonal x, y, and z-axes, the drive motor being configured to oscillate a suspended drive mass around the z-axis with oscillating motion substantially in a plane with the x and y-axes;
b) a plurality of drive springs connecting the suspended drive mass to an intermediate suspended mass concentric with the suspended drive mass, each drive spring having a spring element predominantly oriented parallel to the y-axis; and
c) a pedestal mass connected to an underlying substrate, wherein the pedestal mass and intermediate suspended mass are connected by a plurality of anchor springs, each anchor spring having a spring element anchored to the intermediate suspended mass at a first anchor point and anchored to the pedestal mass at a second anchor point, the spring element of each drive spring being anchored to the intermediate suspended mass at a first anchor point and to the suspended drive mass at a second anchor point, wherein the anchor springs are predominantly compliant about the y-axis and the drive springs are predominantly compliant about the z-axis, and wherein the anchor springs are predominantly oriented circumferentially about the z-axis.

11. A MEMS gyro as recited in claim 10, wherein the spring element of each drive spring includes a plurality of straight sections each oriented substantially parallel to the y-axis.

12. A MEMS gyro for sensing rotation comprising: a) a drive motor defining orthogonal x, y, and z-axes, the drive motor being configured to oscillate a suspended drive mass around the z-axis with oscillating motion substantially in a plane with the x and y-axes; and b) a plurality of drive springs connecting the suspended drive mass to an intermediate suspended mass concentric with the suspended drive mass, each drive spring having a spring element with a cross-section having an etch angle that is oblique with respect to the z-axis, wherein the drive springs impart a characteristic out of plane motion to the intermediate suspended mass and the suspended drive mass.

13. A MEMS gyro as recited in claim 12, wherein the etch angle of each spring element is an etch angle that is oblique with respect to the z-axis, and wherein the drive springs impart a characteristic out of plane motion to the intermediate suspended mass that is substantially insensitive to variation in the process induced etch angle of the spring elements.

14. A MEMS gyro as recited in claim 12, wherein the cross-section of each spring element is substantially parallelogram shaped.

15. A MEMS gyro as recited in claim 12, wherein the cross-section of each spring element is substantially trapezoid shaped with two parallel edges orthogonal to the z-axis and with two oblique edges oblique with respect to the z-axis.

16. A MEMS gyro as recited in claim 15, wherein an average angle of each of the two oblique edges is oblique with respect to the z-axis.

17. A MEMS gyro as recited in claim 12, further comprising a pedestal mass connected to an underlying substrate, wherein the pedestal mass and the intermediate suspended mass are connected by a plurality of anchor springs, each anchor spring having a spring element anchored to the intermediate suspended mass at a first anchor point and anchored to the pedestal mass at a second anchor point, the spring element of each drive spring being anchored to the intermediate suspended mass at a first anchor point and to the suspended drive mass at a second anchor point, wherein at least one of the first and second anchor points of each anchor spring is located on a common radius originating at the z-axis with the first and second anchor points of a respective one of the drive springs.

18. A MEMS gyro as recited in claim 17, wherein the spring element of each drive spring is predominantly oriented parallel to the y-axis.

* * * * *